United States Patent Office 3,772,303
Patented Nov. 13, 1973

3,772,303
CIS-NAPHTHOYLENE-BIS-BENZIMIDAZOLE PIGMENT AND PROCESS FOR ITS MANUFACTURE
Ernst Spietschka, Oberauroff, and Josef Landler, Hofheim, Taunus, Germany, and Dieter Wager, East Greenwich, R.I., assignors to Farbwerke Hoechst Aktiengesellschaft vormals Meister Lucius & Bruning, Frankfurt am Main, Germany
No Drawing. Filed Aug. 5, 1971, Ser. No. 169,516
Claims priority, application Germany, Aug. 8, 1970, P 20 39 465.4
Int. Cl. C07d 49/40
U.S. Cl. 260—282    5 Claims

ABSTRACT OF THE DISCLOSURE

The present invention provides a naphthoylene-bis-benzimidazole pigment in a new and valuable β-modification, which is characterized by an X-ray diffraction pattern with maximums of high intensity at the diffraction angles of 4.3°, 6.65° and 13.45° and maximums of medium intensity at the diffraction angles of 4.8°, 12.1° and 14.45°, measured with Cu-K α-irradiation.

The invention furthermore provides a process for the manufacture of the above specified pigment, wherein crude cis-naphthoylene-bis-benzimidazole is heated in water and/or a solvent to temperatures in the range of about 100° to 250° and the pigment thus obtained is isolated in the usual manner.

---

It is already known from German Pat. 430,632 as well as from BIOS 987, page 100, and FIAT 1313, volume 11, page 103, that the condensation of 1,4,5,8-naphthalene-tetra-carboxylic acid-anhydride with 1,2-diaminobenzene yields as reaction product a mixture of the following two isomers:

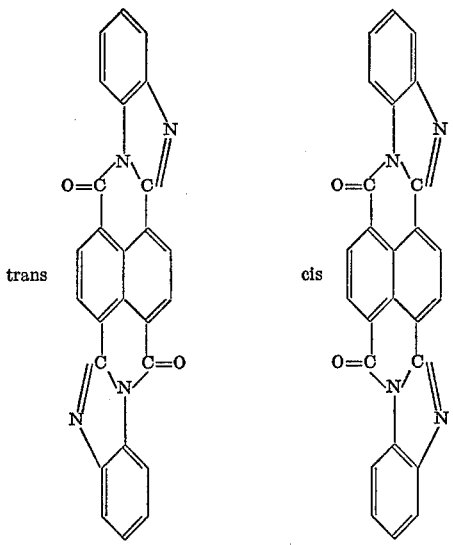

The separation of these two isomers is possible by treating their mixture in ethanol with potassium hydroxide. The trans-isomer thereupon forms a sparingly soluble reaction product with potassium hydroxide which can be easily separated, whereas the reaction product of the cis-isomer remains in the filtrate (separation lye) by reason of its better solubility. The cis-isomer can be isolated therefrom by acidification or hydrolysis. This cis-isomer is then obtained in a crystal modification hereinafter referred to as α-phase and which shows characteristical peaks in the X-ray diffraction diagram at diffraction angles of 3.05°, 5.85°, 12.45° and 13.55°. While the trans-isomer (C.I. Vat Orange 7) has obtained great industrial importance as a vat dyestuff and as pigment, the cis-isomer (C.I. Vat Red 15) is mainly used as vat dyestuff. Many attempts have been made to bring the cis-isomer into a form permitting its utilization as pigment dyestuff; thus, it has been proposed in U.S. Pat. 3,072,661 to separate from the separating lye, after removal by distillation of one part of the alcohol, the cis-isomer by precipitation with p-toluene-sulfonic acid. However, due to the poor fastness to overlacquering and to the dull shades obtained with these products which are in the α-phase, they could not meet the high requirements of the practice.

The new β-modification is prepared by treatment of the α-modification with organic solvents, if necessary with the addition of small amounts of alkaline agents, at elevated temperatures in the range of from 100–25° C., preferably 150–200° C. Since the phase conversion is also possible by heating for several hours in water, if necessary in the presence of surface active agents, the conversion of the α-phase with organic solvents may also be effected in water so that the cis-isomer of the α-modification which is obtained in the form of a wet press-cake may be directly used in this form. The phase conversion may also be effected under pressure, a process condition which is especially favourable when the operation is carried out in the presence of water.

The new β-modification thus obtained shows in the X-ray diffraction diagram (Cu-K α-irradiation) characteristical peaks at the diffraction angles of 4.3°, 4.8°, 6.65°, 12.1°, 13.45° and 14.45°. All these values have an accuracy of 1–2%.

As solvents for the phase-conversion, there may be mentioned, for example aromatic hydrocarbons such as benzene, xylene, halogenated or nitrated aromatic hydrocarbons, such as chlorobenzene, nitrobenzene, aromatic bases such as dimethylaniline, quinoline, esters of organic acids such as benzoic acid methylester, inorganic and organic acid amides such as phosphoric acid-tris-dimethyl amide, dimethylformamide, ketones such as acetone, acetophenone, alcohols such as methanol, butanol, phenols such as o-chlorophenol. Mixtures of these solvents are also excellently suitable for the conversion of the α- into the β-crystal modification. When operating in the presence of water, surface active agents such as oleylaminoacetate, oxethylated stearyl alcohol, collophonium soap or substances having a similar action have proved advantageous.

The particle size of the pigment, and in connection therewith the covering power of the pigment, can be influenced by the nature and the quantity of the solvent or mixture of solvent and water used, the height of the temperature and the duration of the treatment from 1 to 10 hours. The most suitable pigment for lacquer and plastic colourations is a pigment having a surface of 15 to 25 m.²/g. (determined according to the method by Haul-Dümbgen).

The starting material for the phase-conversion is the cis-isomer obtained upon condensation of 1,4,5,8-naphthalene-tetracarboxylic acid anhydride and 1,2-diaminobenzene and following separation of the isomers. As already stated above, the separation can be effected by first isolating the mixture of isomers from the reaction batch and then separating it in the manner described by a treatment with potassium hydroxide in ethanol. It is also possible to effect the condensation of the starting compound under pressure in ethanol, so that condensation and separation of the isomers can be effected in one batch. The separating lye obtained in both cases can be used for the isolation of the cis-isomer. It has been found very advantageous for the phase-conversion as well as with regard to the quality of the resulting pigment when the cis-isomer is caused to separate in crystalline form as potassium hydroxide reaction product from the alkaline separating lye. This is possible, for example, by adding solid or gaseous carbon dioxide or alkali carbonates, after removal of the alcohol from the separating lye by distillation, at a KOH-concentration of about 25% and a ratio of aqueous lye to the cis-compound of about 30:1. If desired, the potassium hydroxide reaction product of the cis-compound may then be subjected to a purification by a treatment with sodium hypochlorite and isolated after hydrolysis as crude pigment of the α-phase.

The pigment of the cis-naphthoylene-bis-benzimidazole of the β-phase obtained according to the invention yields clear red shades in lacquers having high covering and tinctorial power and excellent fastness to light, to weathering and to overlacquering. It may also be used successfully for the dyeing of plastics.

The following examples illustrate the invention:

EXAMPLE 1

(a) 60 g. of 1,4,5,8-naphthalene-tetracarboxylic acid anhydride were heated for 8 hours in an autoclave to 150° C. with 45 g. of o-phenylene-diamine with addition of 7.5 g. of acetic acid in 390 g. of ethanol. The suspension of the dyestuff mixture thus obtained was then added up with ethanol to 690 parts by volume and combined with 162 g. of potassium hydroxide. The mixture was heated for 2 hours to the boiling temperature, undissolved matter was filtered off and washed thoroughly with 30% alcoholic potassium hydroxide solution. The ethanol was completely removed by distillation from the filtrate obtained. The residue amounting to about 340 g. was diluted with the same volume of water and stirred for about 2 hours at 60 to 70° C. with 25 g. of sodium hypochlorite (13% of active chlorine). After purification with active charcoal and following filtration, 33 g. of $CO_2$ in the form of Dry Ice were stirred portionwise into the filtrate, whereupon the yellow alkali addition compound separated in crystalline form. This alkali addition compound could be further purified by a short heating to about 70° C. in 240 g. of sodium hydroxide solution (about 16–20% strength) and 25 g. of sodium-hypochlorite. The crude pigment of the α-phase was obtained from the alkali addition compound by hydrolysis in water at about 70° C.

(b) 100 g. of aqueous wet (20%) crude pigment of the α-phase were heated for 5 hours in a closed vessel to 180–185° C. with 500 g. of water, 2.5 g. of sodium hydroxide solution (33%) and 10 g. of a 10% aqueous solution of an oxethylated stearyl alcohol. The whole was then filtered at about 80° C., washed with water until neutral and dried at 60–100° C. 20 g. of the pigment of the β-phase were obtained which was found to dye polyvinyl chloride red shades which are fast to light.

EXAMPLE 2

100 g. of aqueous wet crude pigment (20%) of the α-phase according to Example 1(a), 500 g. of water and an emulsion of 1 g. of oleylaminoacetate, 3 g. of o-dichlorobenzene, 3 g. of quinoline and 2.5 g. of sodium hydroxide solution in 100 ml. of water were heated for 5 hours in a closed vessel to 185° to 190° C. The whole was then filtered at 80° C., washed with water and dried. Yield 20 g. The pigment converted in this manner into the β-phase was found to be especially suitable for baking lacquers. Clean, intense and covering red shades having excellent fastness to overspraying and to light were obtained therewith.

EXAMPLE 3

100 g. of aqueous wet crude pigment (20%) of the α-phase according to Example 1(a), 500 g. of water, 5 g. of aniline, 2.5 g. of sodium hydroxide solution and 6 g. of a 50% aqueous solution of Na-resinate were heated for 5 hours in a closed vessel to 170–175° C. The aniline was then removed from this suspension by steam distillation, and the pigment of the β-phase thus obtained was isolated and dried. Yield 20 g. This product was found to yield red dyeings with lacquers and polyvinyl chloride having excellent properties of fastness.

EXAMPLE 4

100 g. of aqueous wet crude pigment (20%) of the α-phase according to Example 1 and 400 g. of ethanol were heated for 5 hours in a closed vessel to 145°–150° C. The pigment of the β-phase thus obtained was isolated by suction-filtration and dried. Yield 20 g. In baking lacquers and polyvinyl chloride, this pigment was found to give red dyeings having outstanding properties of fastness.

EXAMPLE 5

20 g. of crude pigment (α-phase) according to Example 1(a) were heated for 2 hours to the boiling temperature (about 245–250° C.) in 200 g. of α-chloronaphthalene. The reaction mixture was then filtered off with suction at 70–80° C. and the filter residue was washed with methanol. The methanol wet product of the β-phase so obtained was dried in a rotary evaporator. Yield 19–20 g. The red pigment obtained in this manner was found to be especially suitable for the dyeing of polyvinyl chloride.

We claim:

1. Cis-naphthoylene-bis-benzimidazole in the β-crystal modification, characterized by an X-ray diffraction diagram obtained by means of Cu-K α-irradiation and showing maximums of high intensity at the diffraction angles of 4.3°, 6.65°, and 13.45° and maximums of medium intensity at 4.8°, 12.1° and 14.45°.

2. Cis-naphthoylene-bis-benzimidazole in the β-crystal modification according to claim 1, having a surface of between 15–25 m.$^2$/g., preferably 20 m.$^2$/g., determined according to the Haul-Dümbgen method.

3. Process for the manufacture of cis-naphthoylene-bis-benzimidazole in the β-crystal modification which shows in the X-ray diffraction diagram by means of Cu-K α-iddadiation maximums of high intensity at the diffraction angles of 4.3°, 6.65° and 13.45° and maximums of medium intensity at the diffraction angles of 4.8°, 12.1° and 14.45°, wherein a suspension of cis-naphthoylene-bis-benzimidazole of the α-modification is heated in water, a solvent or mixtures thereof at temperatures in the range of from about 150–200° C., and the pigment thus obtained is isolated.

4. A process as claimed in claim 3, where the treatment is effected in the presence of water and an anionic, neutral or cationic dispersing agent.

5. A process as claimed in claim 3, wherein aromatic hydrocarbons, their nitro- or halogen derivatives, aromatic bases, esters, inorganic or organic acid amides, ketones or alcohols or their mixtures are used as solvents.

References Cited

UNITED STATES PATENTS

| 1,927,928 | 9/1933 | Eckert et al. | 260—282 |
| 1,952,661 | 3/1934 | Eckert et al. | 260—282 |
| 3,072,661 | 1/1963 | Pizzarello | 260—282 |
| 3,444,172 | 5/1969 | Senshu | 260—282 |

FOREIGN PATENTS

| 430,662 | 6/1926 | Germany | 260—282 |

DONALD G. DAUS, Primary Examiner

U.S. Cl. X.R.

106—288 Q

Dedication 3,772,303.—*Ernst Spietschka*, Oberauroff; *Josef Landler*, Hofheim, Taunus, Germany and *Dieter Wager*, East Greenwich, R.I. CIS-NAPHTHOYLENE-BIS-BENZIMIDAZOLE PIGMENT AND PROCESS FOR ITS MANUFACTURE. Patent dated Nov. 13, 1973. Dedication filed Feb. 19, 1980, by the assignee, *Hoechst Aktiengesellschaft*.

Hereby dedicates said patent to the Public.

[*Official Gazette, June 17, 1980.*]